United States Patent
Chino (10) Patent No.: US 7,053,921 B2
(45) Date of Patent: May 30, 2006

(54) TRANSFER APPARATUS

(75) Inventor: Naoyoshi Chino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 177 days.

(21) Appl. No.: 09/972,961

(22) Filed: Oct. 10, 2001

(65) Prior Publication Data

US 2002/0063909 A1 May 30, 2002

(30) Foreign Application Priority Data

Oct. 10, 2000 (JP) .............................. 2000-309066

(51) Int. Cl.
*B41J 27/00* (2006.01)
*G03B 17/50* (2006.01)

(52) U.S. Cl. ..................... 347/241; 347/256; 396/30

(58) Field of Classification Search ................ 347/226, 347/238, 233–235, 239, 241, 255–258, 244, 347/248, 136–137; 349/2; 396/30; 358/906
See application file for complete search history.

(56) References Cited

U.S. PATENT DOCUMENTS 4,828,366 A * 5/1989 Nelson ..................... 349/22
5,032,911 A 7/1991 Takimoto
5,970,215 A 10/1999 Stephenson

FOREIGN PATENT DOCUMENTS

| EP | 0 982 141 A1 | 3/2000 |
|----|--------------|--------|
| JP | 4-194832 | 7/1992 |
| JP | 10-309829 | 11/1998 |
| JP | 11-242298 | 9/1999 |
| JP | 11242298 A * | 9/1999 |

* cited by examiner

*Primary Examiner*—Hai Pham
(74) *Attorney, Agent, or Firm*—Sughrue Mion, PLLC (57) ABSTRACT

The transfer apparatus includes a light source, a light linearizing device for linearizing light from the light source, a transmission type image display device, and a photosensitive recording medium. The light source, the light linearizing device, the transmission type image display device and the photosensitive recording medium are arranged along a direction in which the light from the light source advances, and a display image transmitted through the image display device is transferred to the photosensitive image recording medium. The light linearizing device converts the light from the light source into linear and substantially parallel rays such that the linear and substantially parallel rays can be incident on a display screen of the image display device and scans relatively the display screen of the image display device with the linear and substantially parallel rays.

10 Claims, 5 Drawing Sheets

FIG.4C
FOUR ROWS

FIG.4D
TWO ROWS

TRANSFER APPARATUS

BACKGROUND OF THE INVENTION

1. Field of the Invention

The present invention relates to a transfer apparatus which displays an image recorded in digital form by a digital still camera (DSC), a video camera, a personal computer or the like through a transmission type image display device such as a liquid crystal display device (LOD), and transfers the displayed image to a photosensitive recording medium such as an instant photographic film which develops color by light, thereby forming an image.

2. Description of the Related Art

Conventionally known examples of a method for transferring (i.e., printing) or recording a digitally-recorded image to or on a photosensitive recording medium include an ink jet system using a dot-type printing head, a laser recording system, and a thermal recording system.

A printing system like the ink jet system has various problems. For example, printing takes time, ink is likely to cause clogging, and precision printing results in the sheet being moistened by ink. The laser recording system involves an expensive optical component such as a lens, resulting in high apparatus cost. Further, the laser recording system and the thermal recording system require considerable power consumption, and are not suited to be carried about.

Thus, generally speaking, the transfer apparatuses used in these systems and, in particular, the ones used in the ink jet system have a problem in that the more precise the apparatus, the more complicated the driving mechanism and the control mechanism, and the larger and the more expensive the apparatus, printing taking a lot of time.

In this regard, JP 10-309829 A and JP 11-242298 A disclose transfer apparatuses of the type in which a display image is formed on a photosensitive recording medium like an instant film by using a liquid crystal device, thereby achieving simplification in structure and a reduction cost.

The electronic printer disclosed in JP 10-309829 A is capable of copying the display screen of a liquid crystal display on a photosensitive medium to produce a hard copy of a quality equal to that of a photograph. However, in order to copy the display screen of the liquid crystal display on the photosensitive medium in this electronic printer, an optical component such as a rod lens array is arranged between the display screen of the liquid crystal display and the photosensitive medium, so that a predetermined distance (total conjugate length) is required between them. In the example shown, the requisite distance is 15.1 mm. Further, the optical component is rather expensive.

Figure 9:
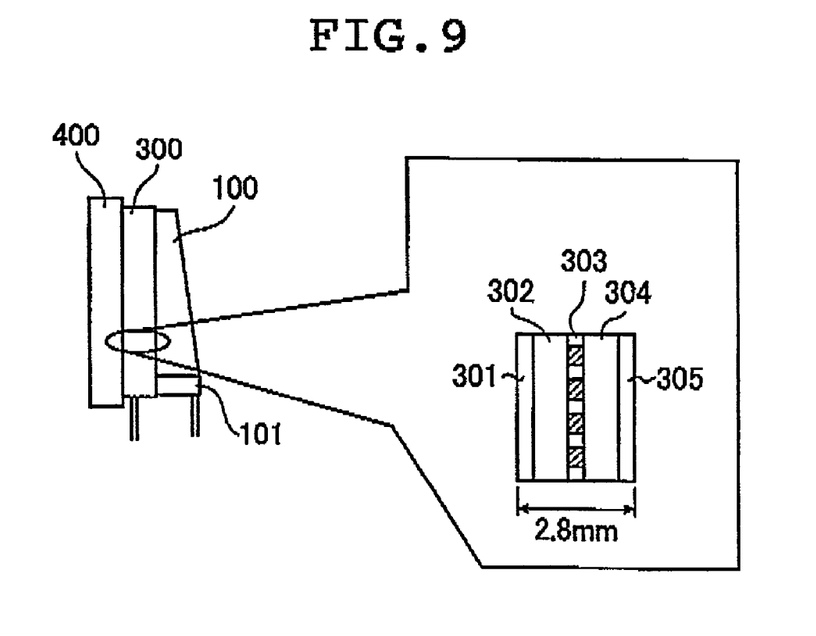
FIG. 9 is a side view showing the construction of an example of a conventional transfer apparatus.

In the case of the transfer apparatus disclosed in JP 11-242298 A, there is no need to use an expensive optical component such as a lens or to secure an appropriate focal length. Thus, as compared with the conventional transfer apparatuses, a further reduction can be achieved in terms of size, weight, power consumption, and cost. As shown in FIG. 9, a photosensitive film 400 is closely attached to the display surface of a transmission type liquid crystal display (hereinafter referred to as LCD) 300, and a light source (back light 100) provided on the opposite side of the photosensitive film 400 with respect to the LCD 300 is turned on. That is, a fluorescent lamp 101 is switched on to turn on the back light, whereby the image displayed on the LCD 300 is transferred to the photosensitive film 400.

Figure 10:
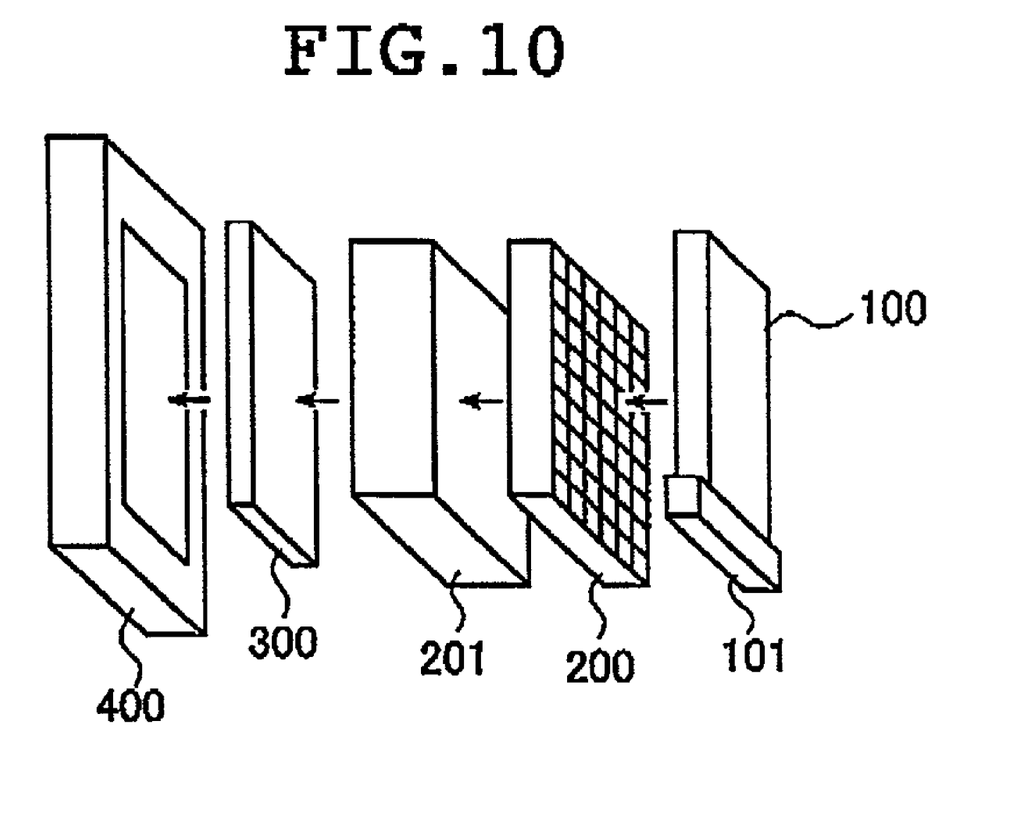
FIG. 10 is a perspective view showing the construction of another example of a conventional transfer apparatus.

Further, as shown in FIG. 10, the above-mentioned publication discloses another embodiment, according to which a lattice 200 is provided between the back light 100 and the LCD 300, whereby diffusion of light from the back light 100 is restrained. That is, the light is approximated to parallel rays. Further, by providing a spacer 201 consisting of a rectangular hollow member between the lattice 200 and the LCD 300, it is possible to prevent the image of the frame of the lattice 200 (the shadow due to the frame) from being taken by the photosensitive film 400, thus improving the clarity of the image formed on the photosensitive film 400 to a satisfactory degree from the practical point of view without providing an optical component or securing an appropriate focal length.

Further, as shown in FIG. 9, the publication discloses an example of a transfer apparatus in which the thickness of the LCD 300, that is, the sum total of the thicknesses of the following components: a polarizing plate 301 on the display surface side, a glass substrate 302, a liquid crystal layer 303, a glass substrate 304, and a polarizing plate 305 on the back light 100 side is 2.8 mm and in which the image on the screen of the LCD 300 with a dot size of 0.5 mm is transferred to the photosensitive film 400. To prevent diffusion of the light from the LCD 300, there is provided a 5 mm lattice with a thickness of 10 mm, and a 20 mm spacer 201 is arranged between the lattice 200 and the LCD 300. Further, the LCD 300 and the photosensitive film 400 are closely attached together to effect image transfer without involving blurring (unclarity) of the image.

In this case, an image displayed with a dot size of 0.5 mm is transferred with an enlarge dot size of up to 0.67 mm, which means an enlargement by approximately 0.09 mm on one side, and yet the image obtained is satisfactory from the practical point of view.

As described above, in the transfer apparatus disclosed in JP 11-242298 A, image transfer is effected, with the liquid crystal display (LCD) and the photosensitive film being closely attached together, to prevent blurring (unclarity) of the image and to obtain an image satisfactory from the practical point of view. It is to be noted, however, that exposure of the photosensitive film in this arrangement involves the following problems.

First, as shown in FIG. 9, on the outermost surface of the LCD 300, there is arranged the film-like polarizing plate 301, which is closely attached to the photosensitive film 400 during exposure. When the photosensitive film 400 is moved to perform a post-processing, the photosensitive film 400 and the polarizing plate 301 are rubbed against each other to thereby flaw the film-like polarizing plate 301, and the flaw on the polarizing plate 301 is transferred to the photosensitive film 400. Further, this flaw causes scattering of light, resulting in deterioration in the image quality.

Further, by holding the photosensitive film 400 and the polarizing plate 301 in close contact with each other, foreign matter such as dirt or blemish is allowed to adhere to the polarizing plate 301, thereby deteriorating the clarity and image quality of the transfer image. Further, this makes the apparatus subject to spot failure, and it is necessary to frequently clean the surface of the polarizing plate 301.

It might be possible for the polarizing plate and the photosensitive film to be closely attached together during exposure and slightly spaced apart from each other when the photosensitive film is moved. For this purpose, however, it would be necessary to provide, apart from the photosensitive film moving mechanism, a mechanism for effecting close attachment and detachment of the photosensitive film, which is contradictory to the requirement for a reduction in cost and size.

Further, generally speaking, a photosensitive film, for example, an instant film, which is the easiest to use, is kept in a lightproof case until it is loaded in a transfer apparatus. Since this lightproof case is equipped with an opening frame somewhat larger than the film, the following procedures must be followed before the photosensitive film can be brought into close contact with the polarizing plate.

First, prior to exposure, one photosensitive film is extracted singly from the lightproof case, and brought into close contact with the surface of the polarizing plate on the surface of the LCD. In this condition, exposure is performed, and, after the completion of the exposure, the photosensitive film is separated from the polarizing plate surface, and moved for a next processing (In the case of an instant film, a processing liquid tube provided in the film sheet is pushed open).

These procedures must be repeated for each photosensitive film. In particular, separating the photosensitive film from the polarizing plate surface does not square with automation (or mechanization).

To eliminate these procedures, it would be necessary to prepare a special LCD of a size which would allow insertion into the opening frame, resulting in an increase in cost.

Recently, an LCD with a large display screen is commercially available. In the case of the transfer apparatus disclosed in the above-mentioned publication, when using an LCD with a large display screen, it is necessary to prepare a large size (large area) lattice of a predetermined lattice interval, which makes the production considerably difficult, resulting in high cost.

Recently, the screens of LCDs have progressed in terms of definition, and LCDs with an increased number of pixels and a smaller dot size are being commercialized. For example, as LCDs using low-temperature polysilicon type TFTs, UXGA (10.4 inches; 1200×1600 pixels), XGA (6.3 and 4 inches; 1024×768 pixels) are on the market.

An attempt to apply an LCD with such a high definition screen to the transfer apparatus disclosed in JP 11-242298 A would lead to the following problem. In the case of UXGA, the dot size of each of the RGB pixels is approximately 0.04 mm on the shorter side. In a transfer apparatus as disclosed in the above-mentioned publication, in which enlargement in dot size is involved, it would be impossible to transfer an LCD image of such a minute dot size to a photosensitive film with satisfactory clarity in a condition in which the dots of the RGB pixels are clearly distinguishable.

SUMMARY OF THE INVENTION

It is an object of the present invention to eliminate the above problems in the prior art and to provide a transfer apparatus which can realize a substantial reduction in size, weight, power consumption, and cost with a simple structure and which can also be formed as a portable device.

Another object of the present invention is to provide a low-cost transfer apparatus in which scattered light component is removed even when a large-screen transmission type image display device is used, converting exclusively the component closer to parallel rays to a linear and substantially parallel rays uniform in a predetermined direction before causing the same to perpendicularly enter the image display device, whereby it is possible to transfer (form) an image of high clarity on a photosensitive recording medium with light bearing the display image transmitted through the image display device, making it possible to obtain a transfer image of high clarity.

Still another object of the present invention is to provide a low-cost transfer apparatus in which there is no need to use an expensive planar light source (back light) for which it is difficult to emit uniform light from the entire plane and which needs a large number of components such as a light guide plate (member), a reflection sheet, a lens sheet, a prism sheet, and a diffusion sheet, making it possible to reduce the cost of the light source itself.

To achieve the above objects, the inventors of the present invention have conducted careful study on a low-cost transfer apparatus which is capable of obtaining a transfer image of high clarity, which is of higher practical value, and which allows use of a transmission type image display device such as a liquid crystal display. As a result of the study, it has been found that to prevent image blurring (unclearness) and obtain a transfer image of high clarity with an apparatus of a simple structure and high practical value, it is necessary to remove the scattered light component and convert the light to linear and substantially parallel rays consisting of components closer to parallel rays before causing the light to perpendicularly enter the image display device. For this purpose, it is desirable to convert the light from the light source to linear and substantially parallel rays by a light linearizing device provided with a plurality of through-holes in one direction, which also leads to reduction in cost. Further, by forming the light source itself as a linear light source, it is possible to obtain linear and substantially parallel rays of uniform intensity in one direction and to achieve the reduction in cost.

The present invention provides a transfer apparatus comprising: a light source; a light linearizing device for linearizing light from the light source; a transmission type image display device; and a photosensitive recording medium, wherein the light source, the light linearizing device, the transmission type image display device and the photosensitive recording medium are arranged along a direction in which the light from the light source advances, and a display image transmitted through the image display device is transferred to the photosensitive image recording medium, and wherein the light linearizing device converts the light from the light source into linear and substantially parallel rays such that the linear and substantially parallel rays can be incident on a display screen of the image display device and scans relatively the display screen of the image display device with the linear and substantially parallel rays.

Preferably, the light source is a linear light source, and wherein the light linearizing device converts the light from the linear light source into the linear and substantially parallel rays.

Preferably, the linear light source and the light linearizing device are integrally combined with each other and the image display device and the photosensitive recording medium are also integrally combined with each other such that the linear light source and the light linearizing device can be moved along a side of the transmission type image display device in a relative relation to the image display device and the photosensitive recording medium.

Preferably the light source is a planar light source, and wherein the light linearizing device converts the light from the planar light source into the linear and substantially parallel rays.

Preferably, the light linearizing device is movable along a side of the planar light source.

Preferably, the light linearizing device has a plurality of through-holes arranged in a direction perpendicular to a direction in which the light linearizing device is moved, and wherein the plurality of through-holes have a circular or polygonal cross section and a thickness not less than three times the diameter or equivalent diameter of the plurality of through-holes.

Preferably, the display image on the image display device and the image transferred to the photosensitive recording medium are substantially identical in size.

Preferably, each pixel size of the image display device is not more than 0.2 mm.

Preferably, the image display device is a transmission type liquid crystal display.

DETAILED DESCRIPTION OF THE PREFERRED EMBODIMENTS

A transfer apparatus according to preferred embodiments of the present invention will now be described in detail with reference to the accompanying drawings.

Figure 1:
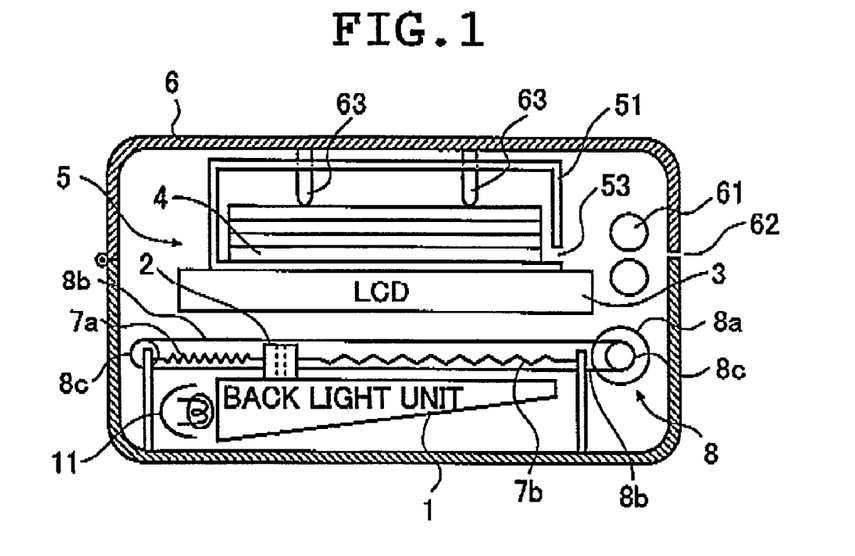
FIG. 1 is a schematic side sectional view of a transfer apparatus according to an embodiment of the present invention.
Figure 2:
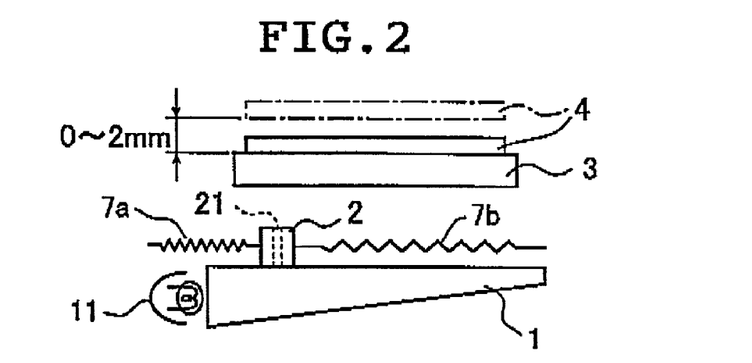
FIG. 2 is a conceptual side sectional view showing a main portion of the transfer apparatus shown in FIG. 1.

FIG. 1 is a schematic side sectional view of a transfer apparatus according to an embodiment of the present invention, and FIG. 2 is a conceptual side sectional view showing a main portion of the transfer apparatus shown in FIG. 1.

As shown in these drawings, the transfer apparatus of the present invention comprises a back light unit 1 serving as a light source, a porous plate 2 which is a light linearising device for generating linear and substantially parallel rays, a liquid crystal display device (LCD) 3 which is a transmission type image display device for displaying an image recorded in digital form, a film case 51 accommodating photosensitive films 4 used as a photosensitive recording medium, and a main body case 6 containing the back light unit 1, the porous plate 2, the LCD 3, and the film case 51.

Here, it is desirable that the porous plate 2, the LCD 3, and the photosensitive film 4 be arranged in series, preferably at least LCD 3 and the photosensitive films 4 be arranged in a non-contact state, along the direction in which the light from the back light unit 1 advances. A moving device 8 enables the porous plate 2 to move over the light emission surface of the back light unit 1 along one side of the LCD 3. On the front and rear sides of the porous plate 2 with respect to the moving direction thereof, there are arranged shielding masks (films) 7a and 7b for shielding light from other than the through-holes 21 of the porous plate 2. In FIG. 1, the porous plate 2 is in contact with the back light unit 1, but this is not the essential requirement in the present invention.

The back light unit 1 serving as the light source irradiates the LCD 3 all over from behind with uniform light, and is a planar light source having a light emission surface substantially the same as the display screen of the LCD 3. It comprises a bar-like lamp 11 such as a cold-cathode tube, a light guide plate (not shown) for introducing the light emitted from the bar-like lamp 11 in a predetermined direction, a reflection sheet (not shown) for reflecting the light introduced to the light guide plate in a direction substantially perpendicular thereto, and a back light assembly having a diffusion sheet (not shown) for uniformalizing the light reflected by the reflection sheet, a prism sheet, etc.

There are no particular limitations regarding the back light unit 1 used in the present invention. It may be of any type as long as it is a planar light source which uniformly diffuses light emitted from a cold cathode tube 11 by using a back light assembly composed of a light guide plate, a reflection sheet, a diffusion sheet, a prism sheet, etc. It is possible to use a well-known LCD back light unit. In the example shown, the size of the light emitting surface may be the same as the size of the display screen of the LCD 3 or the photosensitive surface of the photosensitive film 4. However, this should not be construed restrictively. It may be somewhat larger than the size of the display screen of the LCD 3 or the photosensitive surface of the photosensitive film 4.

As long as it is a planar light source capable of emitting light of a desired intensity, the back light unit 1 used in the present invention may also comprise an LED array light source, a light source using an organic or inorganic EL panel or the like.

The porous plate 2 used in the present invention is arranged between the back light unit 1 and the LCD 3, and serves as a light linearizing device which converts the light from the back light unit 1 into linear and substantially parallel rays and makes the light enter the LCD 3 as parallel as possible before causing the light to perpendicularly enter the LCD 3. It comprises a rectangular plate of a predetermined thickness in which a large number of through-holes 21 of a predetermined size are provided at a predetermined pitch in one or several rows (in one row in the example shown in FIG. 3A).

In the present invention, the light linearizing device serves to convert the light from the light source into linear and substantially parallel rays before causing them to enter perpendicularly the transmission type image display device. It is adapted to emit linear light of a predetermined length in a direction (longitudinal direction) perpendicular to the moving direction of the light linearizing device (the scanning direction of the transmission type LCD screen).

Figure 3A:
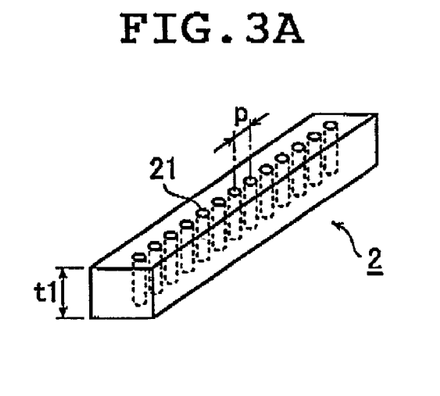
FIG. 3A is a perspective view showing the construction of an embodiment of a porous plate used in the transfer apparatus shown in FIG. 1 as a light linearizing device.

The light linearizing device may be of any type as long as it has the above-mentioned function. Taking into account the ease of production, it is desirable that it comprises, as shown in FIG. 3A, a so-called columnar porous plate which has a predetermined thickness and is small in width and thin (narrow and long) and which has a large number of through-holes arranged longitudinally at least in one row (as in the example shown in FIG. 3A).

In the present invention, the distance between the porous plate 2 and the LCD 3 is set at preferably 0.05 mm to 10 mm, and more preferably 0.1 mm to 5 mm. This measure is taken for the purpose of preventing the pattern of the through-holes 21 of the light linearizing device, typified by the columnar porous plate 2, from appearing in the form of a "shadow" due to diffused light. The above setting of the distance is made such that the appearance of the "shadow" as mentioned above can be prevented, without deteriorating the clarity of the transferred image.

There are no particular limitations regarding the material of the porous plate 2. It is possible, for example, to use a metal plate such as an aluminum plate, a resin plate or a carbon plate having a predetermined thickness. Nor are there any particular limitations regarding the thickness of the porous plate 2. It may be appropriately selected in accordance with the requisite clarity of the transferred image or the size of the display screen of the LCD 3 and the photosensitive surface of the photosensitive film 4. From the practical point of view, the porous plate 2 may be produced by, for example, stacking porous sheets together or resin molding. However, there are no particular limitations in this regard. It may be produced by any method including a method by which holes are formed by machining.

Further, there are no particular limitations regarding the configuration of the through-holes 21 provided in the porous plate 2. It may be, for example, cylindrical, cylindroid-like, or prism-like. That is, the cross section of the through-holes 21 is not limited particularly and may be, for example, circular, elliptical or polygonal such as square or hexagonal. However, to facilitate the preparation, it is desirable for the cross section of the through-holes 21 to be circular or polygonal. Further, while it is desirable for the through-holes 21 to be parallel to each other in the thickness direction of the porous plate 2, they may be substantially parallel to each other.

There are no particular limitations regarding the size of the through-holes 21. However, the diameter (in the case of a circle) or equivalent diameter (in the case of an ellipse, polygon or the like) of the through-holes 21 of the porous plate 2 is preferably not more than 5 mm, more preferably not more than 3 mm, and most preferably not more than 1.5 mm. The lower limit is not limited to any particular value, but is preferably not less than about 0.2 mm taking into consideration the ease of production.

Figure 4A:
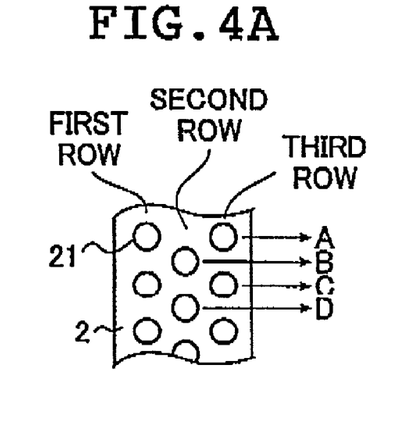
FIGS. 4A, 4B, 4C and 4D are plan views showing examples of the arrangement of through-holes in the porous plate shown in FIG. 3A, respectively.

When a plurality of through-holes 21 are arranged in two or more rows, the number of rows of the through-holes 21 or the form in which the through-holes 21 are arranged are not limited in any particular way. For example, they may be preferably arranged in a lattice-like fashion or a zigzag fashion (a close-packed fashion), with the zigzag fashion being more preferable. The number of rows may be one or more, but when the through-holes 21 are formed in more than one row, the number of rows is preferably even for the zigzag arrangement, because when the porous plate 2 has the through-holes 21 in odd number of rows including three rows as shown in FIG. 4A, the LCD 3 is illuminated in lines A and C with the light from two through-holes 21 in the first and third rows, but in lines B and D only with the light from one through-hole 21 in the second row and hence lines B and D are darker than lines A and C and may cause dark streaks.

The plurality of through-holes 21 may be formed in the porous plate 2 at any pitch p as long as the through-holes 21 are uniformly arranged and the display image of the LCD 3 can be clearly transferred to the photosensitive film 4. It may be set in accordance with the size of the through-holes 21 or other factors. For example, the arrangement pitch p is preferably as small as possible.

Figure 4B:
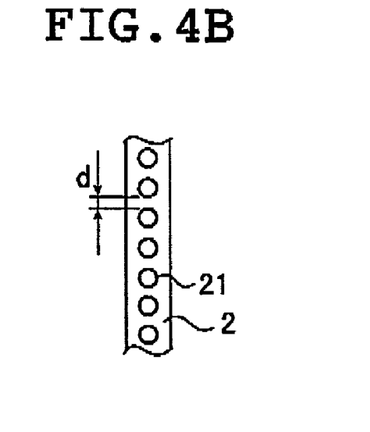
Figure 4C:
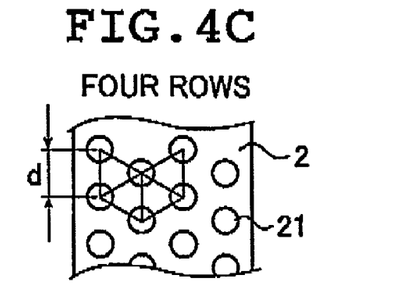
Figure 4D:
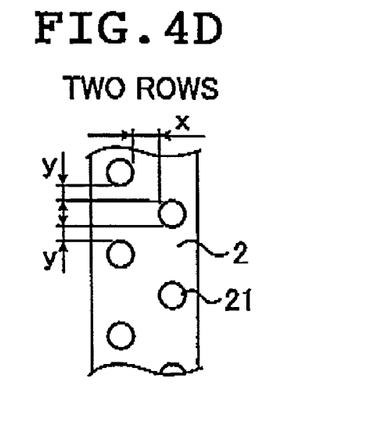

In the present invention, the distance d between the adjacent two through-holes is not limited to any particular value, but is a more important factor than the arrangement pitch p and the size of the through-holes 21, because if the distance d between the adjacent through-holes is increased, the porous plate 2 must be spaced apart from the LCD 3 by a larger distance in order to prevent the pattern of the through-holes 21 from appearing in the form of a "shadow" due to the diffused light. Therefore, the distance d between the adjacent through-holes is preferably not more than 1 mm, more preferably not more than 0.5 mm and most preferably not more than 0.2 mm in terms of the distance y in the longitudinal direction in which the through-holes 21 are arranged. The lower limit is not limited to any particular value but is preferably not less than about 0.05 mm taking into consideration the ease of production. The distance d between the adjacent through-holes 21 in terms of the distance in the longitudinal direction as used herein refers to the distance d between the most adjacent two through-holes 21 when the through-holes 21 are formed in the porous plate 2 in one row as shown in FIG. 4B, or when the through-holes 21 are formed in more than one row (four rows in FIG. 4C) in a close manner as shown in FIG. 4C, and refers to the distance y in the longitudinal direction between the two through-holes 21 which are the most adjacent when projected from the direction perpendicular to the longitudinal direction. When the through-holes 21 are arranged in a zigzag fashion as shown in FIG. 4D, the distance x in the direction perpendicular to the longitudinal direction has a larger degree of freedom than the distance y mentioned above. More specifically, the distance x is preferably not more than 2 mm, more preferably not more than 1 mm and most preferably not more than 0.5 mm. As mentioned above, the distances x and y may not be set at similar values in the porous plate 2 used in the present invention. For example, y may be equal to 0.2 mm or x may be equal to 0.5 mm or 1 mm. Thus, the present invention can have an important characteristic feature that the production is facilitated by the reduction in the constraints on the production.

It is desirable for the thickness t1 of the porous plate 2 to be not less than three times, preferably five times, more preferably seven times the diameter or equivalent diameter of the through-holes 21. The above-mentioned equivalent diameter is a dimension expressed as "4× area/total-peripheral-length (or total circumferential length)". The diameter or equivalent diameter of the through-holes 21 of the porous plate 2 is set at not more than 5 mm, and the thickness t1 of the porous plate 2 is set at not less than three times the diameter or equivalent diameter of the through-holes 21 because these settings are effective in obtaining parallel rays by means of the porous plate 2.

Further, of the entire surface of the porous board 2, it is desirable to construct at least the inner surfaces of the through holes 21 as surfaces which have a low reflectance, and it is more desirable to construct the entire surface of the porous board 2 as a low reflectance surface. Here, the low reflectance surface refers to a surface in which the reflectance of incident light is decreased, such as a blackened surface or a roughened surface. Methods for forming the blackened surface are not particularly limited, but include, for example, a method of using a black material for forming the porous board 2, and a method of blackening the surface. Note that black materials include, for example, a material containing 1% or more (desirably, 3% or more) of carbon black powder, and a material comprised of hardened carbon powder. Examples of the blackening processing include, for example, painting and chemical processing (plating, oxidization, electrolysis, etc.). On the other hand, the roughening processing is not particularly limited, either. A method may be freely selected such as a method of roughening the surface simultaneously with processing the holes, or a method of roughening the surface by means of processing performed after a mechanical processing method such as sandblasting or after a chemical processing such as etching. In this case, regarding the degree to which the surface is roughened, the Ra roughness in the range of 1 µm–20 µm is effective.

Note that, in the present invention, the reflectance of at least the inner surface of the through holes 21 of the porous board 2, preferably, the reflectance of the low reflectance surface comprising the entire surface of the porous board 2 is preferably not more than 2% and more preferably not more than 1%. This is because if the reflectance is not more than 2%, the porous plate 2 can absorb effectively the scattered, non-parallel light incident from the back light unit 1, so that only the substantially parallel light (including the parallel light) can be effectively emitted from the back light 1 and is incident on the LCD 3. Note that the reflectance can be measured at a wavelength of 550 nm using a spectroreflectometer MPC3100 manufactured by Shimadzu Corporation.

As described above, the porous plate 2 is positioned between the back light unit 1 constituting the light source and the LCD 3, and is movable laterally as seen in FIGS. 1 and 2 (in the longitudinal direction of the back light unit 1) together with the shielding masks 7*a* and 7*b* arranged on the front and back sides thereof with respect to the moving direction. The movement of the porous plate 2 is effected for the purpose of shielding light from the back light unit 1, which is a planar light source, so as to exclusively allow the light from the through-holes 21 of the porous plate 2 to pass, and of dividing it linearly into linear light to successively send it to the LCD 3.

The moving device 8 for moving this porous plate 2 includes a motor 8*a* arranged at the right-hand end of the back light unit 1 in FIG. 1, a pulley 8*c* mounted on the motor 8*a*, another pulley 8*c* arranged at the left-hand end of the back light unit 1 in FIG. 1, and an endless belt 8*b* which is stretched between the pulleys 8*c* and to which the longitudinal end portion of the porous plate 2 is attached. It is desirable that the moving device 8 comprises two sets each of which includes an endless belt 8*b* and pulleys 8*c* and which are mounted on the respective ends of the porous plate 2 in the longitudinal direction, with the two endless belts 8*b* (only one of which is shown) being driven continuously in synchronism with each other.

The speed at which the porous plate 2 is moved by the moving device 8 varies according to the brightness of the back light unit 1 constituting the light source, the size (diameter or equivalent diameter) or pitch of the through-holes 21 of the porous plate 2, etc. It is desirable for the speed to be several mm to several hundreds of mm per second.

The moving device 8 used in the present invention is not limited to the above-described system, in which the endless belts 8*b* are attached to the end portions of the porous plate 2 in the longitudinal direction and driven. Any well-known moving system will be adopted. For example, it may be a system in which the porous plate 2 is secured to a traveling nut and a drive screw threadedly engaged with the traveling nut is driven, or a system in which the porous plate 2 is secured to one end of a wire and the wire is taken up.

Figure 3B:
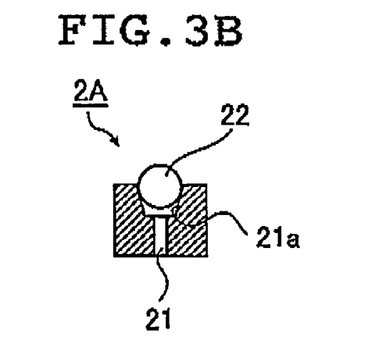
FIG. 3B is a cross-sectional view showing the construction of another embodiment of a porous plate used in the transfer apparatus shown in FIG. 1 as a light linearizing device.

The light linearizing device used in the present invention is not limited to the above-described columnar porous plate 2. It is also possible to use a porous plate 2A as shown in FIG. 3B. In the porous plate 2A shown in FIG. 3B, a continuous recess 21*a* is provided above the through-holes 21 arranged in a row, and a rod lens 22 is set in this recess 21*a*. In this porous plate 2A, the rod lens 22 is used to convert the light emitted from the through-holes 21 of the porous plate 2 into more parallel rays.

Further, in the present invention, instead of the porous plate, it is also possible to use a slit plate having a slit by which strip-like slit light can be obtained. However, compared with the porous plate, the slit is rather inferior in its ability to prevent the scattering of light in the longitudinal direction thereof. Thus, the porous plate 2 shown in FIG. 3A and the porous plate 2A shown in FIG. 3B are more preferable than the slit plate. However, when there is little light diffusion component from the light source, and when the requisite level of clarity is not so high, the slit plate may be used.

The LCD 3 is a transmission type image display device for displaying digitally-recorded images. The transmission type image display device in the present invention is not limited to any particular type but also include various transmission type electronic image display devices including the LCD 3, as far as the image display device is connected to the digital image supply section of a digital still camera, a digital video camera, a personal computer or the like, and displays a display image as a transmitted image in accordance with the digital image data supplied. Another example includes a transmission type image carrying device such as a photographic film on which a film is formed, but the LCD is preferably used.

In the digital image data supply section of a digital camera or the like connected to the LCD 3, an arbitrary image can be selected from among images prepared beforehand and supplied. Apart from the above, the digital image data supplied to the LCD 3 may also be data read from a transmission original or a reflection original by a scanner or the like. Further, the LCD 3 may be of any type as long as it can display an image as a transmitted image. It may be of the type which displays an image on the basis of analog image data on an image taken by an ordinary video camera instead of digital image data.

A predetermined gap is provided between the LCD 3 and the porous plate 2. As stated above, this gap is preferably 0.05 mm to 10 mm, and more preferably 0.1 mm to 5 mm. It is desirable for the gap to be adjustable to an arbitrary dimension.

Figure 5:
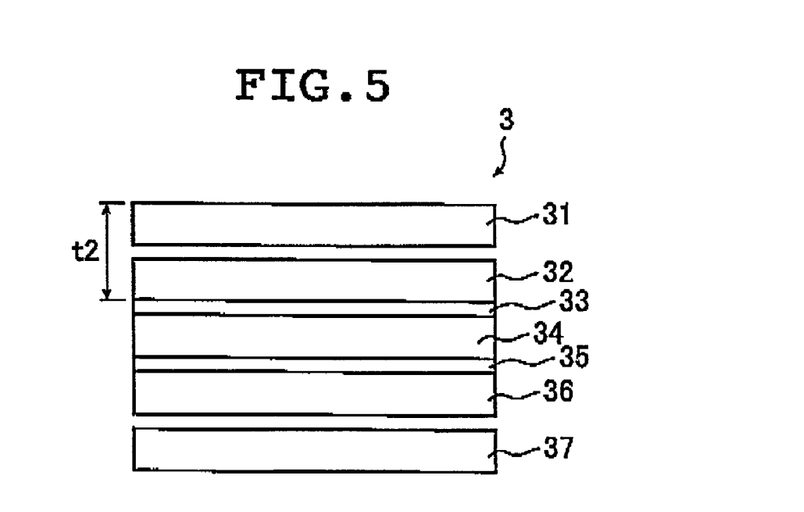
FIG. 5 is a perspective view showing the construction of an embodiment of a transmission type liquid crystal image display device used in the transfer apparatus shown in FIG. 1.

As shown in FIG. 5, the LCD 3 is formed by stacking together, from the photosensitive film 4 side toward the porous plate 2 side (the back light unit 1 side), a film-like polarizing plate (hereinafter also referred to as the polarizing film) 31, a glass substrate 32, an electrode 33, a liquid crystal layer 34, an electrode 35, a glass substrate 36, and a film-like polarizing plate 37, the liquid crystal layer 34 being held between the glass substrates 32 and 36 and further held by means of the polarizing plates 31 and 37 from both outsides thereof. It goes without saying that although not shown, there are further provided a barrack matrix, an RGB color filter, an orientation film, etc., as is well known in the art. For example, in the case of a TFT type LCD, the electrode 33 is a common electrode, and the barrack matrix, the RGB color filter, etc. are arranged between the electrode 33 and the glass substrate 32, the electrode 34 consisting of a display electrode, a gate electrode, etc. Instead of the glass substrates 32 and 36, it is also possible to use resin substrates or the like.

The construction of the LCD 3 is not particularly limited, as long as a transfer image can be displayed. For example, can be used an LCD having a well-known liquid crystal display mode and driven by a well-known driving system. Examples of the liquid crystal display mode include liquid crystal display modes using a polarizing plate, such as TN mode, STN mode, CSH mode, FLC mode, and OCB mode. Examples of the driving system include active matrix driving systems using TFTs, diodes, etc. and direct matrix driving systems using XY stripe electrodes.

There are no limitations regarding the size of the LCD 3. It is possible to select an appropriate size in accordance with the size of the photosensitive film. Further, there are no particular limitations regarding the dot size of each RGB pixel of the LCD 3. However, to obtain a clearer photographic image of high quality, it is desirable for the size of each pixel on at least the shorter side to be not more than 0.2 mm. If the size is not more than 0.2 mm, it is possible to obtain a clearer transfer image.

There are no particular limitations regarding the number of pixels (or pixel density) of the LCD 3. However, to obtain a high-quality transfer image of high definition and high clarity, it is desirable to use an LCD having a high-definition screen with a small RGB pixel dot size which is recently on the market. Examples of such an LCD include TFT type LCDs, such as UXGA (10.4 inches; 1200×1600 pixels) and XGA (6.3 and 4 inches; 1024×768 pixels).

In the LCD 3 used in the present invention, it is desirable for the sum total t2 of the thicknesses of the substrate 32 and the polarizing film 31 at least on the photosensitive film 4 side to be as small (thin) as possible. It is set at not more than 1.0 mm, more preferably not more than 0.8 mm, and most preferably not more than 0.6 mm. Still more preferably, it is desirable for the sum total of the thicknesses of the substrate 36 and the polarizing film 37 on the back light unit 1 (the porous plate 2) side to be also small. It is set preferably at not more than 1.0 mm, more preferably not more than 0.8 mm, and most preferably not more than 0.6 mm.

While there are no particular limitations regarding lower limit values, the thickness of the glass substrate 32, for example, may be set at not less than 0.5 mm, since the thickness of the glass substrate 32 can only be reduced to approximately 0.5 mm. The sum total thickness values as mentioned above should not be construed restrictively. To realize the above condition, it is also effective to use resin substrates instead of the glass substrates. In that case, the lower limit value of approximately 0.5 mm can be further reduced.

The reason for limiting the sum total t2 of the thicknesses of the substrate 32 and the polarizing film 31 on the photosensitive film 4 side to not more than 1.0 mm in the present invention will be explained below.

By thus limiting the sum total t2 of the thicknesses of these components, diffusion of light in the section between the back light unit 1 and the LCD 3 is restrained, and, if, strictly speaking, the display surface of the LCD 3 and the photosensitive surface of the photosensitive film 4 are held in a non-contact state, it is possible to obtain a clearer transfer image.

That is, in the transfer apparatus of the present invention, it is desirable that the display surface of the LCD 3 and the photosensitive surface of the photosensitive film 4 are spaced apart from each other by a predetermined distance to hold them in a non-contact state. This is certainly a condition necessary for obtaining a transfer apparatus which has a simple structure and which is of higher practical value and easy to handle. On the other hand, this is rather undesirable from the viewpoint of obtaining a clear transfer image since it aggravates the light diffusion between the display surface of the LCD 3 and the photosensitive surface of the photosensitive film 4. In view of this, in the present invention, the disadvantage due to the non-contact state (the increase in light diffusion) is compensated for by the advantage due to the above-mentioned sum total thicknesses (the suppression of light).

As stated above, the conventional transfer apparatus disclosed in JP 11-242298 A, shown in FIG. 9, uses an LCD having a thickness of approximately 2.8 mm. As shown in FIG. 9, the LCD comprises the two polarizing plates 301 and 305, the two substrates 302 and 304, and the liquid crystal layer 303 held between them. Although not stated in the above-mentioned publication, generally speaking, the thickness of liquid crystal itself is approximately 0.005 mm (See "Color TFT Liquid Crystal Display", p 207, published by Kyoritsu Shuppan). Thus, it is to be assumed that the sum total of the thicknesses of the substrate 301 (305) and the polarizing plate 302 (304) is approximately 1.3 mm to 1.4 mm.

Light diffusion degree is in proportion to distance. Thus, when the above-mentioned thickness of 1.3 mm to 1.4 mm is reduced by half, the diffusion degree is also reduced by half, and it is to be assumed that the value "enlarged by approximately 0.09 mm On one side", referred to with reference to the prior art, is also reduced to ½, that is, approximately 0.04 mm to 0.05 mm. However, as stated with reference to the prior art technique, with this level of diffusion degree, overlapping of adjacent dots occurs in a latest LCD with a minute dot size, such as UXGA or XGA.

That is, when the diffusion degree is solely reduced to approximately 0.04 mm to 0.05 mm, the image obtained is rather unclear due to the occurrence of dot overlapping and color blurring attributable thereto. However, quite unexpectedly, a study by the present inventors has shown that, as stated above, by setting the sum total of the thicknesses of the substrate 32 and the polarizing film 31 at least on the photosensitive film 4 side at not more than 1.0 mm, the color blurring due to dot overlapping is eliminated even in the case of an LCD 3 of a minute dot size, such as UXGA or XGA, making it possible to obtain a clear transfer image. It is to be assumed that this is due to the fact that the scattering by the glass substrate 32 and the polarizing film 31 of the LCD 3 is reduced.

In the present invention, it is preferable that the photosensitive surface of the photosensitive film 4 is arranged with a predetermined gap between it and the display screen of the LCD 3.

The film case 51 accommodates a plurality of photosensitive films 4. In the present invention, it is possible to load a set (pack) of photosensitive films 4 in the film case 51 mounted inside the main body case 6 or to load a film pack 5 in which a plurality of photosensitive films 4 are accommodated in the detachable film case 51 in the main body case 6. It is desirable to adopt a construction in which the film pack 5 including the film case 51, that is, the film case 51 accommodating a plurality of photosensitive films 4 can be loaded.

The photosensitive film 4 is used as the photosensitive recording medium in the present invention. In the present invention, any type of photosensitive recording medium will do as long as it allows formation of a visible positive image by exposure printing of a transmitted display image in the LCD 3, and there are no particular limitations in this regard. For example, it is desirable to use a so-called instant photographic film or the like. Examples of the photosensitive film 4 used as the photosensitive recording medium include "instax mini" and "instax" (manufactured by Fuji Photo Film Co., Ltd.), which are mono-sheet type instant photographic films.

Such instant photographic films are commercially available in the form of a so-called film pack in which a predetermined number of films are accommodated in a film case.

Thus, in the present invention, if an arrangement is possible in which the gap between the photosensitive surface of the photosensitive film 4 and the display screen of the LCD 3 satisfies the condition mentioned below, it is possible to load the film pack 5 as it is in the main body case 6, as shown in FIG. 1.

Figure 6:
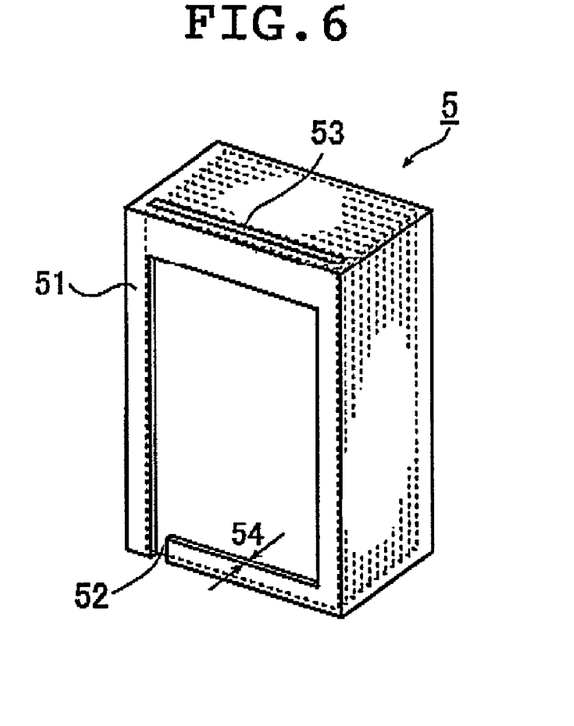
FIG. 6 is a perspective view showing the construction of an embodiment of a film pack used in the transfer apparatus shown in FIG. 1.

FIG. 6 shows the construction of an embodiment of the film pack 5.

At one end of the film case 51 of the film pack 5 shown, there is provided a cutout 52 which admits a claw member for extracting the film sheet 4 from the film pack 5 (the film case 51), and the film sheet 4 which has undergone exposure is extracted from an outlet 53 of the film case 51 of the film pack 5 by the above-mentioned claw member, and is transferred to a processing position by a conveying mechanism (not shown).

Here, the "processing" means pushing open a processing liquid (developer) tube (not shown) provided at one end of the film sheet 4 beforehand and causing the developer to be uniformly spread over the entire inner surface of the film sheet 4. It is executed substantially simultaneously with the extraction of the film sheet 4 from the film pack 5 and the conveyance thereof. After the processing, the film sheet 4 is conveyed to the exterior of the apparatus through an extraction outlet 62 of the main body case 6 (See FIG. 1).

As is well known, an instant photographic film of this type makes it possible to form a complete image for appreciation in about several tens of seconds after the above-mentioned processing. Thus, in the transfer apparatus of the present invention, the function of performing up to the above-mentioned processing is required. After one film sheet has been sent out, the next film sheet appears, realizing a preparation state for the next exposure (transfer).

Regarding the method of handling this film pack described above, the instant camera using an instant photographic film disclosed in commonly assigned JP 4-194832 A, is to be referred to.

In FIG. 6, numeral 54 indicates the height of the edge (stepped portion) of the film case 51 of the film pack 5. By setting the height 54 of this edge at a desired dimension, it is possible to set the distance between the display surface of the LCD 3 and the photosensitive surface of the photosensitive film 4 at a predetermined value as mentioned below.

Thus, in the present invention, apart from the fact that the height 54 of this edge is adjusted to a desired dimension, the film pack of a well-known conventional instant photographic film is applicable.

Also in the case in which the film case 51 is mounted in the main body case 6 beforehand and in which only one set of photosensitive films 4 is loaded in the film case 51, it is possible to set the distance between the display surface of the LCD 3 and the photosensitive surface of the photosensitive film 4 to a predetermined range as mentioned below by setting the height 54 of this edge at a desired dimension.

While, in the example shown in FIG. 1, the film case 51 is in direct contact with the display surface of the LCD 3 outside the effective image range of the photosensitive film 4, this should not be construed restrictively. When the height 54 of the edge of the film case 51 is small, the film case 51 may be mounted or loaded so as to be spaced apart from the display surface of the LCD 3 by a predetermined distance. Further, in the present invention, the film case 51 may be brought into contact with the holding panel externally holding the display surface of the LCD 3, but the conditions mentioned below are preferably satisfied.

As stated above, in the transfer apparatus of the present invention, in order to satisfy the conditions required for realizing an apparatus actually easy to handle, the LCD 3 and the photosensitive film 4 are in a non-contact state. Strictly speaking, it is desirable that the display surface of LCD 3 and the photosensitive surface of the photosensitive film 4 are held in a non-contact state and spaced apart from each other by a predetermined distance. In accordance with the present invention, from the viewpoint of obtaining a clear transfer image, it is desirable that the disadvantage due to the above arrangement, i.e., the increase in light diffusion, is compensated for by the advantage of the suppression of light diffusion which is achieved by making the sum total t2 of the thicknesses of the glass substrate 32 and the polarizing film 31 on the photosensitive film 4 side of the LCD 3 mentioned above not more than a predetermined dimension.

When it is said that the LCD 3 and the photosensitive film 4 are arranged in a non-contact state, it means that the display surface of the LCD 3 and the photosensitive surface of the photosensitive film 4 are spaced apart from each other by a predetermined distance and are not in direct contact with each other. Actually, as stated above, it is also possible to adopt an arrangement in which while the film case 51 of the film pack 5 is in contact with the LCD outside the effective range of the image of the photosensitive film 4, there is a space between the photosensitive surface of the photosensitive film 4 and the display surface of the LCD 3.

Apart from this, it is also possible to adopt an arrangement in which there is provided between the display surface of the LCD 3 and the photosensitive surface of the photosensitive film 4 a transparent glass plate or film of a predetermined thickness, thus substantially maintaining a predetermined distance between them and not holding them in direct contact with each other.

In the transfer apparatus of the present invention, the distance between the LCD 3 (i.e., its display surface) and the photosensitive film 4 (i.e., its photosensitive surface) is preferably 0.01 mm to 3 mm, more preferably 0.1 mm to 3 mm. As stated above, this arrangement is rather disadvantageous from the viewpoint of obtaining a clear transfer image. However, it is a condition necessary for realizing an apparatus actually easy to handle. The disadvantage due to this arrangement can be compensated for by the suppression of light diffusion, which can be achieved by making the sum total t2 of the thicknesses of the glass substrate 32 and the polarizing film 31 on the photosensitive film 4 side of the LCD 3 mentioned above not more than a predetermined dimension.

In the transfer apparatus of the present invention, it is desirable that the size of the image displayed on the LCD 3 be substantially the same as the size of the image transferred to the photosensitive film 4. This is due to the fact that, in the present invention, a direct transfer system is adopted in which no enlargement or reduction is effected using a lens system, thereby making it possible to achieve a reduction in the size and weight of the apparatus.

The main body case 6 is a case containing the above-mentioned components of the present invention, that is, the back light unit 1, the porous plate 2, the LCD 3, the film pack 5 (or the film case 51), a pair of rollers 61 for transferring a film which has undergone exposure and developing the processing liquid, etc. In the main body case 6, the pair of rollers 61 for transferring a film which has undergone exposure and developing the processing liquid are mounted at a position where they face the exposed-film extraction outlet 53 of the loaded film pack 5 (or the film case 51). Further, the main body case 6 has at a position facing this pair of rollers 61 the outlet 62 for extracting the exposed film 4 from the main body case 6. Further, the main body case 6 is provided with a back-up pressurizing pin 63 which is inserted from an opening on the back side of the exposed-film pack 5 and which presses the film sheets 4 against the front edge of the film case 51, that is, the LCD 3 side.

Although not shown, it goes without saying that the transfer apparatus of the present invention includes a drive source (motor) for driving the roller pair 61, a power source for driving the drive source and lighting up the bar-like light source 11 of the back light unit 1, electrical equipment for controlling these components, a data processing device which receives digital image data from a digital image data supply section in order to display an image on the LCD 3 and which converts the received data into image data for LCD display, and a control unit. It is also possible to use the motor 8a of the moving device 8 for the porous plate 2 as the motor for driving the roller pair 61.

Figure 7:
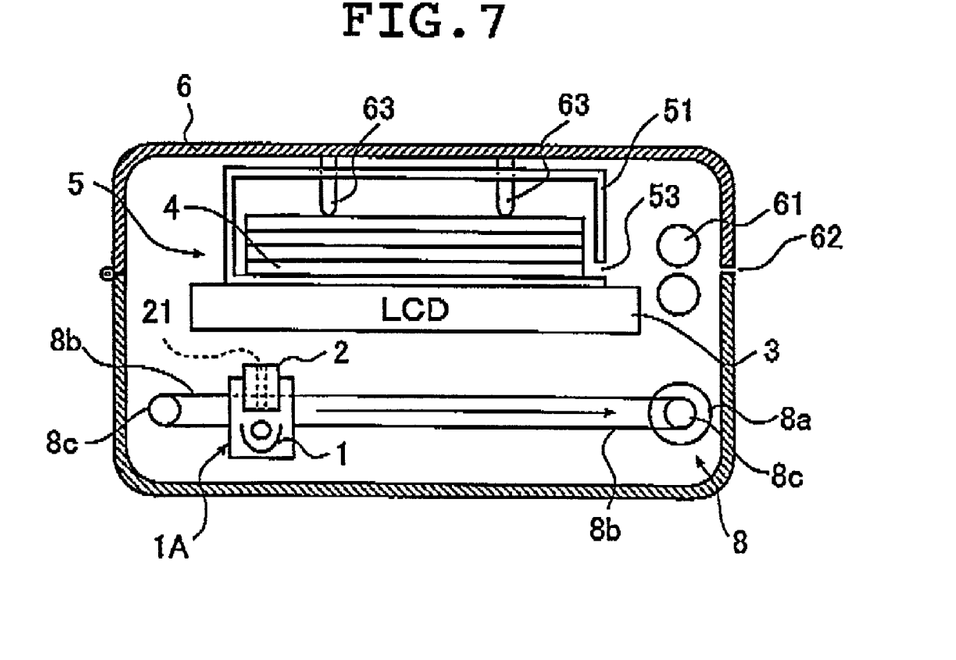
FIG. 7 is a schematic side sectional view of a transfer apparatus according to another embodiment of the present invention.

In the above-described transfer apparatus, linear and substantially parallel rays are generated by using the back light unit 1 as a planar light source and the porous plate 2 as a light linearizing device. However, this should not be construed restrictively. As shown in FIG. 7, it is also possible to use a linear light source including a bar-like lamp such as a straight cold-cathode tube.

Figure 8A:
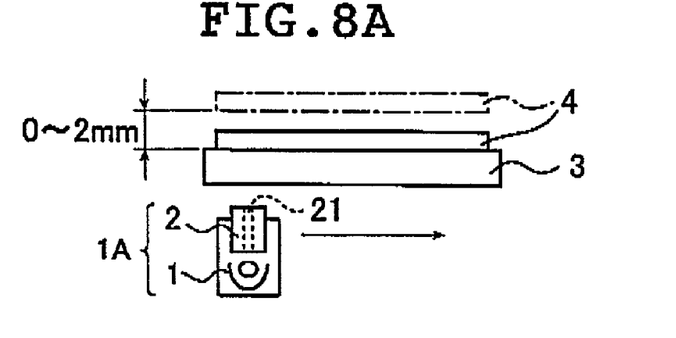
FIG. 8A is a conceptual side sectional view illustrating a main portion of the transfer apparatus shown in FIG. 7 for an example in which a linear and substantially parallel rays generating unit moves.
Figure 8B:
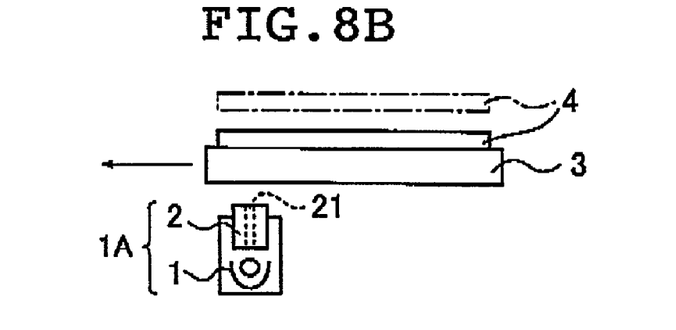
FIG. 8B is a conceptual side sectional view illustrating a main portion of the transfer apparatus shown in FIG. 7 for another example in which an LCD is moved.

FIG. 7 is a schematic side sectional view of a transfer apparatus according to another embodiment of the present invention, and FIGS. 8A and 8B are conceptual side sectional views illustrating a main portion of the transfer apparatus of the present invention according to the embodiment shown in FIG. 7.

As shown in these drawings, the transfer apparatus of the present invention comprises a linear and substantially parallel rays generating unit 1A in which a linear light source 1 serving as the light source and a porous plate 2 serving as the light linearizing device are integrated with each other as a unit, a liquid crystal display device (LCD) 3 which is a transmission type image display device for displaying a digitally-recorded image, a film case 51 accommodating photosensitive films 4 serving as the photosensitive recording medium, and a main body case 6 containing the linear and substantially parallel rays generating unit 1A, the LCD 3, and the film case 51.

The transfer apparatus shown in FIGS. 7, 8A and 8B is basically the same as the transfer apparatus shown in FIGS. 1 and 2 except that the linear light source 1 and the porous plate 2 are integrated with each other to form the linear and substantially parallel rays generating unit 1A and that no shielding masks 7a and 7b are provided. Thus, the same components are indicated by the same reference numerals, and a description of such components will be omitted. It goes without saying that the transfer apparatus shown in FIGS. 1 and 2 is similar to that shown in FIGS. 7, 8A and 8B in construction, function and modifiability.

In the transfer apparatus shown in FIG. 7, the linear and substantially parallel rays generating unit 1A is a unit formed by integrating the linear light source 1 including the bar-like lamp 11 such as the straight cold-cathode tube with the prism-like porous plate 2 serving as the light linearizing device. It has a function of causing the light from the linear light source 1 to enter perpendicularly the transmission type LCD 3 as linear and substantially parallel rays. It emits linear light having a width in a direction (longitudinal direction) perpendicular to the direction in which the linear and substantially parallel rays generating unit 1A and the transmission type LCD 3 are moved relatively (the scanning direction on the display screen of the transmission type LCD).

FIG. 8A shows an example in which the transmission type LCD 3 is stationary, while the linear and substantially parallel rays generating unit 1A moves. FIG. 8B shows another example in which the linear and substantially parallel rays generating unit 1A is stationary, while the LCD 3 integrated with the photosensitive film 4 moves. Although both the examples are applicable in the present invention, the example shown in FIG. 8A in which the linear and substantially parallel rays generating unit 1A moves, is more preferable in that the apparatus can be made more compact.

The linear light source 1 used in the linear and substantially parallel rays generating unit 1A has a bar-like lamp 11 such as a cold-cathode tube, a diffusion film, and a reflection plate such as a reflector, and is adapted to uniformly diffuse the light from the bar-like lamp 11 by using the diffusion film, reflection plate, etc. This, however, should not be construed restrictively. Any type of light source will do as long as it provides strip-like light. For example, it is possible to combine a bar-like light source with a thin and narrow organic or inorganic EL panel, etc. to obtain strip-like slit light by using a light source of a predetermined length and a slit plate, or to arrange LEDs or the like in a row to obtain light dots in a row. In the latter case, it is desirable to keep the LEDs in alignment with the positions of the through-holes 21 of the porous plate 2.

In this embodiment, it goes without saying that the light linearizing device used in the linear and substantially parallel rays generating unit 1A may include the porous plate 2 shown in FIG. 3A or the porous plate 2A shown in FIG. 3B. Apart from this, what is applicable to the transfer apparatus shown in FIG. 1 is applicable to this embodiment without exception.

As shown in FIG. 7, in this embodiment, the linear and substantially parallel rays generating unit 1A formed by integrating the linear light source 1 with the porous plate 2 is attached to the endless belts 8b of the moving device 8, which is different from the embodiment shown in FIG. 1, in which the light linearizing device (porous plate 2) is attached to the endless belts 8b of the moving device 8. It goes without saying, however, that there is no difference between the two embodiments in the function and operation of the moving device 8 or in the function and operation of the light linearizing device (porous plate) moved by the moving device 8. As in the case of the transfer apparatus shown in FIG. 1, in the transfer apparatus shown in FIG. 7, the linear and substantially parallel rays generating unit 1A is moved by the moving device 8 to thereby successively send the linear light from the linear and substantially parallel rays generating unit 1A to the LCD 3 and illuminate the image displayed on the LCD 3 through scanning exposure, making it possible to transfer the image to the photosensitive film 4.

As compared with the transfer apparatus shown in FIG. 1, the transfer apparatus shown in FIG. 7 allows a further reduction in the light source size, thereby achieving a further reduction in the size of the apparatus.

The transfer apparatus of the present invention is basically constructed as described above.

EXAMPLES

Specific examples of the transfer apparatus of the present invention will now be described.

Using the transfer apparatuses shown in FIGS. 2 and 8A, digitally-recorded images displayed on the LCD 3 were recorded on the photosensitive films 4 to obtain record images, with the dimensions, mainly the diameter of the through-holes 21 of the porous plate 2 and the thickness of the porous plate 2 being changed. All the porous plates 2 used were blackened such that the reflectance was not more than 2%.

Examples 1-1 to 1-7

In the transfer apparatus shown in FIG. 2, a member in which circular through-holes 21 having a diameter of 2 mm were linearly provided at a pitch (p) of 2.1 mm was prepared for the porous plate 2. The thickness (t1) of the porous plate 2 was 6 mm. The distance between the outlet side (upper surface) of the porous plate 2 and the LCD 3 (spacer thickness) was 2 mm. A film pack of "instax mini", monosheet type instant photographic films (manufactured by Fuji Photo Film Co., Ltd.; image size in terms of diagonal length: 3 in.) was used for the photosensitive film 4.

The LCD 3 prepared has a display screen size of 3.5 in. The back light unit 1 prepared has a size corresponding to the display screen size (3.5 in.) of the LCD 3. The bar-like lamp 11 used is a cold-cathode tube having a length of 70 mm. A power source having a direct voltage of 6.5V was used to turn on the cold-cathode tube and the brightness in the center of the back light unit 1 was measured 1 minute after the cold-cathode tube was turned on. The brightness obtained was 2500 Lv. Further, the color of the light source as measured in terms of the chromaticity coordinates was x=y=0.297. This measurement was made with a spectroradiometer CS1000 of Minolta Co., Ltd.

The speed at which the porous plate 2 is moved by the moving device 8 was adjusted in the range of 1 mm/sec to 100 mm/sec.

Transfer tests were conducted in the construction mentioned above. The dot size (shorter side) of the LCD 3 was 0.08 mm, the sum total (t2) of the thicknesses of the substrate 32 and the polarizing film 31 on the photosensitive film 4 side and that of the thicknesses of the substrate 36 and the polarizing film 37 on the incident side were 0.57 mm and 0.93 mm, respectively, and the distance between the LCD 3 and the photosensitive film 4 was changed in four levels.

Examples 2-1 to 2-7

Transfer tests were conducted under the same conditions as those in Examples 1-1 to 1-7 except that the thickness of the porous plate 2 was changed to 10 mm.

Examples 3-1 to 3-6

The same porous plate 2 as used in Examples 1-1 to 1-7 was used in the transfer apparatus shown in FIG. 8A as the porous plate 2 of the linear and substantially parallel rays generating unit 1A. Transfer tests were conducted in the same manner as in Examples 1-1 to 1-7 except that a cold-cathode tube having a length of 70 mm was used as the linear light source 1 of the linear and substantially parallel rays generating unit 1A.

The LCD 3 prepared has a display screen size of 3.5 in. A power source having a direct voltage of 6.5V was used to turn on the cold-cathode tube and the brightness in the center of the cold-cathode tube was measured 1 minute after the cold-cathode tube was turned on. The brightness obtained was 17600 Lv. Further, the color of the light source as measured in terms of the chromaticity coordinates was x=0.289 and y=0.281. This measurement was made with a spectroradiometer CS1000 of Minolta Co., Ltd.

The speed at which the linear and substantially parallel rays generating unit 1A is moved by the moving device 8 was adjusted in the range of 10 mm/sec to 300 mm/sec.

Examples 4-1 to 4-6

Transfer tests were conducted under the same conditions as those in Examples 3-1 to 3-6 except that only the thickness of the porous plate 2 was changed to 10 mm.

In the above transfer tests, the direct voltage to be applied to the cold-cathode tube of the light source and the scanning speed were adjusted in the rage of 4 to 8V and 1 mm/sec to 300 mm/sec, respectively such that the transfer images obtained have substantially the same densities. For evaluation, the transfer images were observed with a microscope with a magnifying power of 10, and the RGB dot sharpness was evaluated in five levels according to Table 1.

Table 2 shows the results of Examples 1-1 to 1-7 and 2-7, and Table 3 shows the results of Examples 3-1 and 4-1 to 4-6.

TABLE 1

| Evaluation Point | Status |
|---|---|
| 1 | RGB dots are very clearly visible. |
| 2 | RGB dots are clearly visible. |
| 3 | RGB dots are visible without overlapping. |
| 4 | Not more than half the RGB dots are overlapping. |
| 5 | RGB dots are overlapping and indistinguishable. |

TABLE 2

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/ diameter ratio | Evaluation |
|---|---|---|---|---|---|---|---|---|
| Example 1-1 | 0.93 | 0.93 | 0.08 | 0 | 2 | 6 | 3 | 2 |
| Example 1-2 | 0.93 | 0.93 | 0.08 | 1 | 2 | 6 | 3 | 2 |
| Example 1-3 | 0.93 | 0.93 | 0.08 | 2 | 2 | 6 | 3 | 2.5 |
| Example 1-4 | 0.57 | 0.57 | 0.08 | 0 | 2 | 6 | 3 | 1 |
| Example 1-5 | 0.57 | 0.57 | 0.08 | 1 | 2 | 6 | 3 | 1 |
| Example 1-6 | 0.57 | 0.57 | 0.08 | 2 | 2 | 6 | 3 | 1.5 |
| Example 1-7 | 0.93 | 0.93 | 0.08 | 3 | 2 | 6 | 3 | 3 |
| Example 2-1 | 0.93 | 0.93 | 0.08 | 0 | 2 | 10 | 5 | 1 |
| Example 2-2 | 0.93 | 0.93 | 0.08 | 1 | 2 | 10 | 5 | 1 |
| Example 2-3 | 0.93 | 0.93 | 0.08 | 2 | 2 | 10 | 5 | 1 |
| Example 2-4 | 0.57 | 0.57 | 0.08 | 0 | 2 | 10 | 5 | 1 |
| Example 2-5 | 0.57 | 0.57 | 0.08 | 1 | 2 | 10 | 5 | 1 |
| Example 2-6 | 0.57 | 0.57 | 0.08 | 2 | 2 | 10 | 5 | 1 |
| Example 2-7 | 0.93 | 0.93 | 0.08 | 3 | 2 | 10 | 5 | 1.5 |

TABLE 3

| Level | Thickness of substrate and polarizing film on photosensitive film side (mm) | Thickness of substrate and polarizing film on incident side (mm) | LCD dot shorter side length (mm) | Distance between LCD and photosensitive film (mm) | Diameter or equivalent diameter (mm) | Thickness (mm) | Thickness/ diameter ratio | Evaluation |
|---|---|---|---|---|---|---|---|---|
| Example 3-1 | 0.93 | 0.93 | 0.08 | 0 | 2 | 6 | 3 | 2 |
| Example 3-2 | 0.93 | 0.93 | 0.08 | 1 | 2 | 6 | 3 | 2 |
| Example 3-3 | 0.93 | 0.93 | 0.08 | 2 | 2 | 6 | 3 | 2.5 |
| Example 3-4 | 0.57 | 0.57 | 0.08 | 0 | 2 | 6 | 3 | 1 |
| Example 3-5 | 0.57 | 0.57 | 0.08 | 1 | 2 | 6 | 3 | 1 |
| Example 3-6 | 0.57 | 0.57 | 0.08 | 2 | 2 | 6 | 3 | 1.5 |
| Example 4-1 | 0.93 | 0.93 | 0.08 | 0 | 2 | 10 | 5 | 1 |
| Example 4-2 | 0.93 | 0.93 | 0.08 | 1 | 2 | 10 | 5 | 1 |
| Example 4-3 | 0.93 | 0.93 | 0.08 | 2 | 2 | 10 | 5 | 1 |
| Example 4-4 | 0.57 | 0.57 | 0.08 | 0 | 2 | 10 | 5 | 1 |
| Example 4-5 | 0.57 | 0.57 | 0.08 | 1 | 2 | 10 | 5 | 1 |
| Example 4-6 | 0.57 | 0.57 | 0.08 | 2 | 2 | 10 | 5 | 1 |

(Examination of the Results)

It can be seen from Tables 2 and 3 that the transfer images on the LCD 3 are favorably transferred to the photosensitive films 4 in all of Examples 1 to 4. Therefore, the results show that the transfer apparatus of the present invention can transfer the display images on the LCD 3 to the photosensitive films 4 in a satisfactory manner.

The results of Examples 1 to 4 on the conditions (parameters) of the respective components were reviewed in detail, and it can be seen from Tables 2 and 3 that in Examples 1 and 3, when the total thickness of the substrate and the polarizing film is reduced, the dot transfer condition is substantially improved. It is also effective in improving the image quality to reduce the total thickness of the substrate and the polarizing film on the photosensitive film 4 side.

The distance between the LCD 3 and the photosensitive film 4 does not influence the image quality so much if it is within about 3 mm. This is advantageous in producing the apparatus since it facilitates the handling of the photosensitive film 4 (the above-mentioned film sheet).

As compared with Examples 1 and 3, the thickness of the porous plate 2 is increased (from 6 mm to 10 mm) in Examples 2 and 4, which leads to a very remarkable effect. It is considered that this is due to the fact that as a result of the increase in the length of the through-holes 21 of the porous plate 2, the light transmitted therethrough is closer to parallel rays.

Regarding the thickness of the porous plate 2, it can be seen, from the relation between the thickness of the porous plate 2 and the dimension of the through-holes 21 provided in the porous plate 2, that it is very effective to make the value of the coefficient of "thickness of porous plate/ through-hole size of porous plate" not smaller than a certain value. That is, the above-mentioned value indicates the degree to which the light transmitted through the porous plate 2 approximates parallel rays.

Specifically, it is effective to reduce the size of the through-holes or increase the thickness of the porous plate. To reduce the thickness of the entire apparatus, the former measure is preferable. From the restrictions in production, the upper limit of the size of the through-holes is approximately 0.2 mm. From the practical point of view, the size is preferably approximately 0.5 mm to 2 mm. Regarding the thickness, a value ranging from approximately 3 mm to 20 mm is preferable from the practical viewpoint. While Examples show the cases in which the values of "thickness of porous plate/through-hole size of porous plate" are 3 and 5, Tables 2 and 3 show that the value is more preferably not less than 5, and particularly not less than 7.

Thus, with the transfer apparatus of each of the above embodiments, it is possible to substantially improve the clarity of the transfer image. Further, due to the linear structure of the porous plate 2, the production of the porous plate 2 is facilitated, and it is possible to achieve a substantial reduction in cost.

To be more specific, if a porous plate corresponding to the photosensitive film "instax mini" (62 mm×46 mm) used in Examples 1 to 4 is perforated to provide through-holes having a diameter of 0.5 mm in a close manner at a pitch p of 0.7 mm, perforation for about 7000 to 8000 through-holes is required. When through-holes are provided in several rows as in the porous plate 2 of the present invention, the number of through-holes is about 90 to 100 in one row and about 400 in four rows, even if the through-holes are formed in the longitudinal direction (62 mm) of the instax mini. Therefore, the porous plate used in the present invention has an effect of enabling easy production at a low cost as compared with the planar porous plate covering the whole area of the photosensitive film.

Similar transfer tests to those in Examples mentioned above were conducted on the transfer apparatus using the porous plate 2A shown in FIG. 3B. The results of the transfer tests on the transfer apparatus of this embodiment indicated substantially the same function as that of the transfer apparatus using the porous plate 2 shown in FIG. 3A.

The results clearly show the effects obtained by the transfer apparatus of the present invention. Namely, the transfer apparatus of the present invention is capable of obtaining a transfer image from a transmission type image display device and significantly improving the clarity of the transfer image by selecting various parameters.

The above embodiments of the present invention have been described only by way of example, and it goes without saying that the present invention is not restricted thereto. For example, the back light as the light source, the LCD as the image display device, etc. may be ones having various functions within the permissible range. Further, in the embodiment shown in FIG. 5, it is also possible to use, instead of the rod lens, a cylindrical lens, a spherical lens, a semi-spherical lens, etc.

As described above in detail, in accordance with the present invention, it is possible to realize a transfer apparatus which enables, with a simple structure, actual reduction in size, weight, power consumption, and cost.

The effect of the present invention can be further enhanced by considering the above-mentioned additional conditions (selecting particular parameters) in the above-described basic construction.

Further, in accordance with the present invention, the substantially parallel rays which are incident on the transmission type image display device perpendicularly are obtained as linear and substantially parallel rays by means of a light linearizing device, so that there is no need to use a large area (large size) lattice or the like which is difficult to produce and expensive even in the case of a large display screen, thus leading to reduction in cost.

Further, in accordance with the present invention, it is possible to obtain linear and substantially parallel rays by a combination of a linear light source and a light linearizing device. As compared with the case in which a planar light source (back light), for which it is difficult to emit uniform light from the entire plane, is used, this is more advantageous in that linear and substantially parallel rays having a more uniform light intensity in the arrangement (longitudinal) direction can be easily obtained. Further, it is possible to use the fluorescent tube itself as the linear light source, so that there is no need to use an expensive planar light source (back light) which necessitates a large number of components such as a light guide plate (member), a reflection sheet, a lens sheet, a prism sheet, and a diffusion sheet, thereby achieving a reduction in light source cost.

What is claimed is:

1. A transfer apparatus comprising:
   a light source;
   a light linearizing device for linearizing light from the light source;
   a transmission type image display device; and
   a photosensitive recording medium,
   wherein the light source, the light linearizing device, the transmission type image display device and the photosensitive recording medium are arranged along a direction in which the light from the light source advances, and a display image transmitted through the image display device is transferred to the photosensitive image recording medium, and
   wherein the light linearizing device converts the light from the light source into linear and substantially parallel rays such that the linear and substantially parallel rays can be incident on a display screen of the image display device and scans relatively the display screen of the image display device with the linear and substantially parallel rays by relatively moving the light linearizing device on the display screen of the image display device.

2. The transfer apparatus according to claim 1, wherein the light source is a linear light source, and
   wherein the light linearizing device converts the light from the linear light source into the linear and substantially parallel rays.

3. The transfer apparatus according to claim 2, wherein the linear light source and the light linearizing device are integrally combined with each other and the image display device and the photosensitive recording medium are also integrally combined with each other such that the linear light source and the light linearizing device can be moved along a side of the transmission type image display device in a relative relation to the image display device and the photosensitive recording medium.

4. The transfer apparatus according to claim 3, wherein the light linearizing device has a plurality of through-holes arranged in a direction perpendicular to a direction in which said light linearizing device is moved, and
   wherein said plurality of through-holes have a circular or polygonal cross section and a thickness not less than three times the diameter or equivalent diameter of said plurality of through-holes.

5. The transfer apparatus according to claim 1, wherein the light source is a planar light source, and
   wherein the light linearizing device converts the light from the planar light source into the linear and substantially parallel rays.

6. The transfer apparatus according to claim 5, wherein the light linearizing device is movable along a side of the planar light source.

7. The transfer apparatus according to claim 5,
   wherein the light linearizing device has a plurality of through-holes arranged in a direction perpendicular to a direction in which said light linearizing device is moved, and wherein said plurality of through-holes have a circular or polygonal cross section and a thickness not less than three times the diameter or equivalent diameter of said plurality of through-holes.

8. The transfer apparatus according to claim 1, wherein the display image on the image display device and the image transferred to the photosensitive recording medium are substantially identical in size.

9. A transfer apparatus according to claim 1, wherein each pixel size of the image display device is not more than 0.2 mm.

10. The transfer apparatus according to claim 1, wherein the image display device is a transmission type liquid crystal display.

* * * * *